United States Patent [19]
Prager

[11] 3,918,323
[45] Nov. 11, 1975

[54] MOTORCYCLE THROTTLE-GRIP PROTECTOR

[76] Inventor: Barry H. Prager, 1665 Oak Patch, No. 108, Eugene, Oreg. 97402

[22] Filed: Dec. 16, 1974

[21] Appl. No.: 532,765

[52] U.S. Cl................. 74/551.8; 74/488; 180/82 R
[51] Int. Cl.²......................................... B62K 11/14
[58] Field of Search............ 74/551.8, 551.9, 558.5, 74/488, 489, 491; 2/17; 180/77 R, 82 R, 33 R; 296/78.1; 248/188.9

[56] References Cited
UNITED STATES PATENTS

| | | | |
|---|---|---|---|
| 870,770 | 12/1907 | Fuller | 248/188.9 |
| 1,523,654 | 1/1925 | Laslett | 74/489 |
| 1,843,261 | 2/1932 | Bales | 248/188.9 |
| 3,832,912 | 9/1974 | Edwards | 74/551.8 |
| 3,834,249 | 9/1974 | Bothwell | 74/551.8 |

Primary Examiner—Samuel Scott
Assistant Examiner—F. D. Shoemaker
Attorney, Agent, or Firm—Chernoff & Vilhauer

[57] ABSTRACT

A handlebar extension having a circular flange at one end and adapted for fixed attachment to a conventional motorcycle handlebar proximate a handlebar-mounted, twist-grip-type throttle control. The diameter of the flange is greater than the diameter of the throttle control to prevent the throttle control from striking the ground and being unintentionally advanced should the motorcycle tip over while in motion. A resilient fastening member attached to one end of the extension is inserted into the handlebar along with a portion of the extension and expanded to frictionally engage the interior surface of the handlebar. Alternatively, the body of the extension may be formed as an integral part of the handlebar and combined with a separate, removable, flanged cap. In another embodiment, the flange is omitted and the extension is extended a distance beyond the end of the throttle control sufficient to provide the desired protection.

8 Claims, 7 Drawing Figures

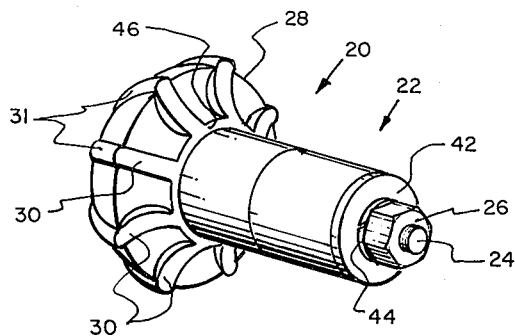
FIG. 1
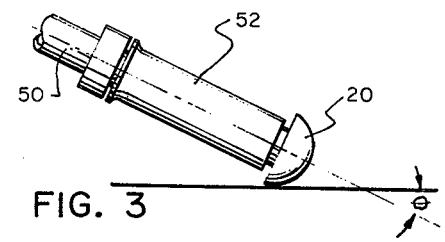
FIG. 3
FIG. 5
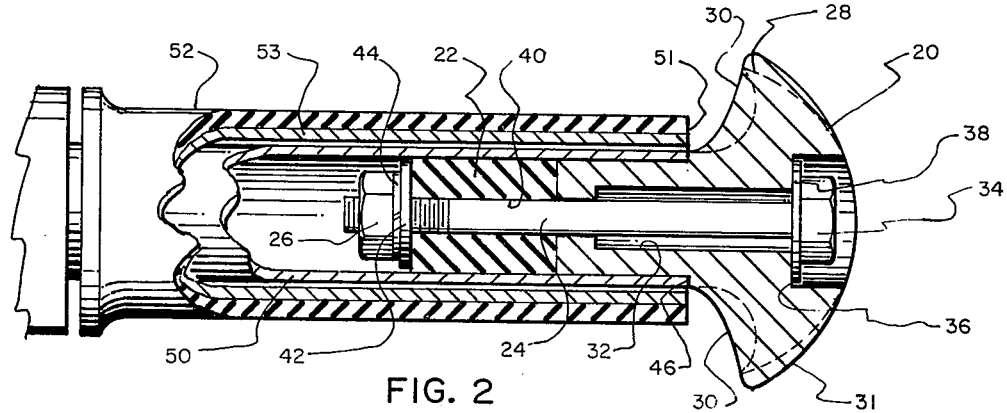
FIG. 2
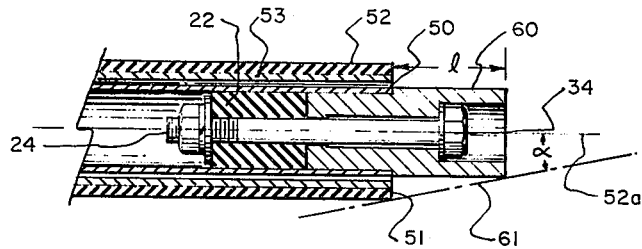
FIG. 4
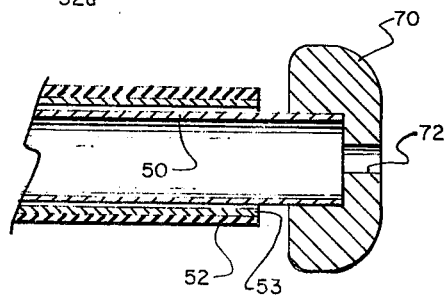
FIG. 6
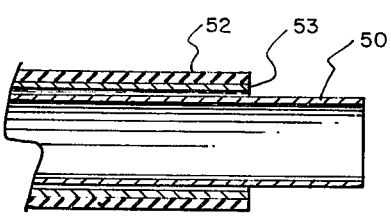
FIG. 7

MOTORCYCLE THROTTLE-GRIP PROTECTOR

BACKGROUND OF THE INVENTION

The present invention relates to a protective device for preventing the unintentional advancement of a motorcycle handlebar-mounted rotatable control should the motorcycle accidentally tip sideways while in motion. Conventional motorcycle throttle controls comprise a rotatable twist-grip mounted on one end of the motorcycle handlebar and connected by cable or other means to an engine-mounted carburetor. Forward rotation of this twist-grip causes a corresponding increase in fuel supply and thus increases the revolutionary speed of the motorcycle engine. Often, when the motorcycle is involved in a traffic accident or when its operator otherwise loses control over the machine, the motorcycle will be tipped sideways while it is still in motion, causing the end of the handlebar-mounted throttle control to strike the ground or other obstruction and be unintentionally rotated forward by the forward motion of the machine. The resulting unanticipated rapid acceleration of the motorcycle engine may cause the motorcycle operator to further lose control of his machine and create an additional hazard to both the operator and to persons within the immediate area. Moreover if the drive wheel loses contact with the ground upon tipping, or if the motorcycle is out of gear, the unexpected advancement of the throttle control results in a rapid and excessive increase in the revolutionary speed of the engine which often causes immediate destruction of the engine.

Attempts have been made to eliminate some other types of hazards caused when the end of a motorcycle handlebar accidentally strikes the ground or other obstruction while the machine is in motion. However, to date there has been insufficient recognition of the aforementioned throttle advancement problems and therefore no successful means have been devised to protect the rotatable throttle grip from such hazard. U.S. Pat. No. 3,832,912 issued to Daniel W. Edwards and U.S. Pat. No. 3,834,249 issued to Peter W. Bothwell both disclose devices designed to protect the motorcycle controls and the motorcycle operator's hands from damage or injury in case of an accident. Unfortunately, neither of the disclosed devices will protect the motorcycle throttle control grip from being advanced forwardly should the end of the handlebar on which the grip is mounted strike the ground or other obstruction while the motorcycle is in motion. With the Edwards device, the end of the throttle grip is almost completely unprotected and could be easily advanced should the motorcycle tip over as described above. The Bothwell device, while designed primarily as a hand protector, does offer some protection for the end of the throttle grip. However, as the width of end plate 14, as disclosed in the figures, is less than the diameter of the throttle grip, it is still possible for the grip to be unintentionally advanced should the end of the handlebar strike the ground or other obstruction. In addition, the attachment of end plate 14 to the end of handlebar 10 by a single, relatively small screw 16 offers little or no resistance to the shearing force that would be encountered by the end plate and transferred to the screw upon contact with the ground. Accordingly screw 16 could be easily sheared immediately on impact, thereby loosening end plate 14 from the end of the handlebar arm permitting the throttle grip to strike the ground or other obstruction and be rotated forward.

Accordingly, a need exists for a device capable of preventing the rotatable throttle grip of a conventional motorcycle from contacting the ground and being unintentionally advanced should the end of the motorcycle handlebar on which the grip is mounted accidentally come in contact with the ground or other obstruction while the motorcycle is in motion.

SUMMARY OF THE INVENTION

The present invention is directed to a device for protecting a motorcycle handlebar-mounted, twist-grip-type throttle control from being unintentionally advanced should the end of the handlebar on which it is mounted strike the ground or other obstruction while the motorcycle is in motion. One embodiment of the present invention comprises a three-piece assembly including a body member having a cylindrical end adapted for mating insertion into the hollow end of a motorcycle handlebar proximate a rotatable, twist-grip-type throttle control and a circular flange on its opposite end having a diameter greater than that of the throttle control grip. A cylindrical resilient fastening member, also insertable into the hollow end of a motorcycle handlebar, is positioned abutting the cylindrical end of the body member. Formed through the longitudinal center of both the body member and the resilient member is an elongate bore through which a bolt is inserted from the flanged end of the body member to engage a nut at the opposite end of the resilient fastening member and complete the assembly. To attach the assembly to a conventional motorcycle handlebar, the three component pieces are assembled and the resilient fastening member and cylindrical end of the body member are inserted into the handlebar at the end near the throttle control grip. The bolt is then tightened thereby compressing and expanding the resilient fastening member until its exterior surface frictionally engages the interior surface of the handlebar. Thus, the only portion of the assembly protruding from the end of the handlebar is the circular flanged end of the body member.

As a motorcycle equipped with the protective device of the present invention is tipped sideways to a degree normally sufficient to cause its throttle control grip to strike the ground, the protruding flanged end of the device will strike the ground instead, thereby not only protecting the throttle grip from damage but, more importantly, preventing the throttle grip from being unintentionally advanced by contact with the ground. Even if the handlebar should approach the ground with the throttle grip positioned substantially horizontal, the greater diameter of the circular flange will prevent the throttle grip from contacting the ground. In addition the wide diameter of the cylindrical end of the body member which is substantially no smaller than the inside diameter of the handlebar so as to mate therewith, offers substantial resistance to the bending and shearing shock forces encountered by the device as it strikes the ground, a significant improvement over known prior art devices.

By utilizing the resilient fastening member or its equivalent to removably attach the protective device to the handlebar, the device may be readily attached as an accessory device to most existing conventional motorcycles. Moreover, should the protective device become damaged after repeated contact with the ground or other fixed objects, it may be readily removed and replaced by simply loosening the bolt and nut employed to expand the resilient fastening member and extracting the device from the handlebar.

The flanged body member is readily and economically molded in large quantities from either hard plastic or metal and combined with the readily available resilient fastening member and nut and bolt to produce an inexpensive yet highly protective device, thereby placing a much needed accessory within the economic grasp of a large number of motorcycle operators.

A second embodiment of the protective device of the present invention includes a body member similar to that described above except that it protrudes outwardly further from the end of the throttle control grip and it is not flanged. This embodiment will adequately protect the throttle grip from coming in contact with the ground if the throttle grip approaches the ground at a sufficient angle upon tipping of the motorcycle, hereinafter referred to as the "angle of incidence," and if the protruding length of the body member is sufficient relative to such "angle of incidence" to cause the protective device to strike the ground instead of the throttle grip.

A further embodiment of the present invention comprises a handlebar and throttle grip combination wherein the handlebar itself is manufactured such that the end on which the throttle grip is mounted extends a distance beyond the end of the throttle grip. A flanged member similar in shape to the flanged end of the body member of the first embodiment may be attached to the portion of the handlebar protruding beyond the end of the throttle grip. Alternatively, the protruding end of the handlebar may merely extend a distance sufficient to provide the desired protection.

It is, therefore, a principal objective of the present invention to provide a protective device capable of preventing a handlebar-mounted, rotatable, twist-grip-type motorcycle throttle control from striking the ground and being unintentionally advanced should the motorcycle tip sideways while in motion.

It is an additional objective of the present invention to provide a protective device for handlebar-mounted, rotatable twist-grip-type motorcycle throttle controls that may be fixedly attached to existing motorcycles as an accessory.

It is a primary feature of the present invention that the protective device protrude axially from the outer end of the twist-grip and be fixedly supported by the handlebar so as not to rotate with the twist-grip.

It is a further primary feature that the protruding portion of the device be fixed to the handlebar by a cylindrical supporting structure having an outside diameter substantially no smaller than the inside diameter of the handlebar so as to resist shear and bending impact stresses.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a perspective view of an accessory embodiment of the protective device of the present invention.

FIG. 2 is a sectional view of the protective device of FIG. 1 mounted in the end of a motorcycle handlebar.

FIG. 3 is a detail view of the protective device of FIGS. 1 and 2 in use, illustrating the "angle of incidence" of the twist-grip.

FIG. 4 is a partial sectional view of an alternate embodiment of the accessory device.

FIG. 5 is a detail view of the protective device of FIG. 4 in use, illustrating the "angle of incidence."

FIG. 6 is a partial sectional view of an embodiment of the protective device similar to that of FIGS. 1 and 2 but for use as original equipment rather than an accessory.

FIG. 7 is a partial sectional view of an embodiment of the protective device similar to that of FIG. 4 but for use as original equipment rather than an accessory.

DESCRIPTION OF THE PREFERRED EMBODIMENT

Referring to the accessory embodiment of FIGS. 1 and 2, the throttle protecting device is seen to comprise a rigid body member 20 and a resilient fastening member 22 assembled as a unit and held together by an elongate bolt 24 and nut 26. Body member 20, which may be molded of impact-resistant plastic or metal, is substantially cylindrical along most of its length except at one end where it expands radially to form a cup-like, circular flange 28. A plurality of strengthening gussets 30, best seen in FIG. 1, are formed between the inner surface of flange 28 and the remainder of the body member to reinforce the flange against external forces tending to cause deformation. The outline of these gussets may be carried through the surface of the flange to form a plurality of raised exterior ribs 31, further strengthening and protecting the flange. Flange 28 could also be formed as a substantially hemispherical solid in which case gussets 30 would not be required. A bore 32 formed along the longitudinal center of body member 20 to accept bolt 24, as shown in FIG. 3, may vary in diameter along its length to permit the body member to be more readily molded from a hard, impact-resistant plastic. Plastic is often difficult to form into a mass of any appreciable bulk because of its tendency to contract upon slow cooling. Varying the diameter of bore 32 permits the walls of body member 20 around the bore to be made relatively thin for faster cooling, yet still sufficiently thick to withstand significant shearing forces. If body member 20 is made of metal, then bore 32 would probably be of uniform cross-section along the encased portion of bolt 24. In either case, the diameter of bore 32 is increased at the flanged end of body member 20 to receive bolt head 34 and a conventional socket wrench therearound for tightening the bolt, and also to form annular ledge 36 which serves to retain the bolt head and its retaining washer 38 in the body member as the bolt is tightened.

The resilient fastening member 22 is also cylindrical in shape with a bore 40 formed along its longitudinal center. The material used to form the member 22 must be sufficiently resilient to permit the fastening member to increase in diameter when compressed by bolt 24 and nut 26 along its longitudinal axis and return to its original shape once the bolt and nut are loosened. A second washer 42 and lock washer 44 are employed near nut 26 to spread the force of the tightened nut over the end of fastening member 22 and to ensure that the nut does not accidentally loosen once it has been tightened.

In use to protect a conventional motorcycle twist-grip-type throttle control control against unintentional advancement, body member 20 and fastening member 22 are first assembled, as shown in FIG. 1, with nut 26 tightened finger-tight so as not to compress and expand the fastening member. The assembled device is then inserted into the hollow end of a motorcycle handlebar 50 proximate the rotatable throttle control grip 52 as shown in FIG. 2. Annular ledge 46 formed around body member 20 near its flanged end prevents the assembled device from being inserted too far into the end of the handlebar 50. The annular ledge 46 must have an outside diameter small enough to avoid contact with the outer end 51 of the rotatable throttle grip 52 or its inner metal sleeve 53 so that the grip will remain freely rotatable. Once the assembled device is in position, bolt 24 is tightened with a conventional socket wrench until fastening member 22 has been compressed and expanded a sufficient amount to frictionally engage the interior surface of the handlebar 50.

As seen in FIGS. 2 and 3, the outside diameter of flange 28 is greater than the outside diameter of throttle control grip 52. This ensures that whenever the motorcycle tips over such that the end of handlebar 50 approaches the ground, as indicated in FIG. 3 the flanged end of body member 20 will strike the ground rather than the unprotected end of throttle grip 52. Geometric forms other than the circular flange 28 shown in the figures may, of course, be employed to provide this protective function as long as the maximum width dimensions, in multiple directions, of the form employed are greater than the corresponding width dimensions of the throttle control grip 52. For conventional motorcycle handlebars the minimum angle of incidence theta (FIG. 3) at which the throttle grip, when equipped with the protective device, approaches the ground is usually substantially greater than zero. However, by maintaining the diameter of flange 28 larger than the diameter of throttle grip 52, the grip will still be prevented from striking the ground even when approaching the ground in a substantially horizontal position, i.e., with the angle theta of FIG. 3 equal to zero. In fact, throttle grip 52 may approach the ground at an angle slightly less than zero and still be protected against contact with the ground by the larger diameter flanged end of body member 20. Annular ledge 46, mentioned above, also serves to prevent the flanged end of body member 20 from being driven into the end of handlebar 50 upon contact with the ground or other obstruction and possibly interfering with the intentional operation of throttle grip 52. Moreover, the large outside diameter of the cylindrical portion of the body member 20 which fits matingly within the handlebar 50 is substantially no smaller than the inside diameter of the handlebar and, therefore, provides great resistance to the shear and bending stresses resulting from the sudden, forceful contact between the protruding flanged portion of the body and the ground which might otherwise break off the flanged portion of the body member thereby defeating its protective purpose.

The ease with which the protective device of the present invention may be inserted into the hollow end of a conventional motorcycle handlebar and fixedly attached permits the device to be readily installed as an accessory on existing motorcycles. The only modification envisioned to the motorcycle would be the removal of any portion of the rubber throttle control grip 52 which might extend over the open end of the handlebar. This may be readily accomplished by the use of any conventional cutting tool and does not interfere with the normal operation of the throttle control grip. In addition, the use of an expandable fastening means, such as fastening member 22, permits the device to be easily removed and replaced should it become marred or damaged after repeated contact with the ground or other obstruction. It is readily apparent that any number of conventional fastening means may be used to attach the device to the handlebar and still allow its easy removal and replacement, including threading the device directly into the end of the handlebar, and it is intended that any such suitable means may be employed without departing from the invention as disclosed.

An alternate embodiment of the accessory, which may be used when the minimum angle of incidence theta at which throttle grip 52 may approach the ground is larger than zero, is seen in FIG. 4 to comprise a rigid, cylindrical body member 60 that protrudes further from the outer end 51 of the grip 52 than does body member 20 and is not flanged. Body member 60 is best constructed of metal rather than hard plastic to permit it to resist the increased shear and bending forces resulting from its extended length. In all other respects this second embodiment is similar to the first embodiment described above. In order for the device of FIG. 4 to perform its intended function the length $l$, by which the body member 50 protrudes from the outer end 51 of the throttle grip 52, and the outside diameter of the protruding portion of the body member 60, must be such that the smallest angle alpha, as shown in FIG. 4, between the longitudinal axis 52a of the grip 52 and an imaginary line 61 extending from the periphery of the outer end 51 of the throttle grip 52 to the periphery of the protruding part of the body member 60 is smaller than the minimum angle of incidence theta. The minimum angle theta (FIG. 5) for any particular motorcycle is of course dependent upon the overall structure of the particular machine, including length, height and curvature of handlebars, and frame configuration of the machine. The minimum angle of incidence can be easily determined simply by laying the motorcycle on its side and moving the handlebars within the range of positions possible if the machine were to tip sideways while moving forward. When attached to the end of a conventional motorcycle handle bar 50, as shown in FIGS. 4 and 5, a properly constructed body member 60 will thus prevent throttle grip 52 from contacting the ground.

A further embodiment of the present invention, and one that is more suitable for adaptation by original equipment manufacturers, is shown in FIG. 6. In this instance, the motorcycle handlebar 50 is manufactured such that the end on which the rotatable throttle control grip 52 is mounted extends beyond the end of the grip and a flanged, cap-like member 70 is attached to the protruding end of the handlebar to give the end of the handlebar the same general cross-sectional outline as the accessory embodiment of FIGS. 1 and 2. Flanged member 70 may be attached to the handle bar by any conventional means such as threaded or frictional engagement, permitting it to be removed and replaced should it become damaged or should it be necessary to remove throttle grip 52 from the handlebar. In this embodiment, as in the accessory embodiment, the protruding or flanged portion of the protective device is highly resistant to shear or bending forces due to impact by virtue of the large-diameter structure which interconnects the protruding portion with the handlebar. An aperture 72 may, if desired, be formed through the center of flanged member 70 to permit air to enter the handlebar and prevent the formation of condensation as the handlebar is exposed to changing temperatures. Similar to body member 20, the diameter of flanged member 70 is greater than that of throttle grip 52 to ensure that as the end of the handlebar approaches the ground its motion will be arrested by flanged member 70 contacting the ground rather than the throttle grip.

In those cases mentioned earlier where the motorcycle is constructed such that, upon tipping, the throttle grip will approach the ground at a sufficiently large angle of incidence, the end of the handlebar 50 proximate the throttle control grip may be extended further, as shown in FIG. 7, and utilized without the addition of flanged member 70 in accordance with the principles previously explained with respect to the embodiment of FIG. 4. When so extended, the end of the handlebar functions to protect throttle grip 52 as does the unflanged, removable embodiment of FIG. 4.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A vehicle handlebar and rotatable throttle control assembly for preventing the unintentional advancement of the throttle control by shielding the outer end thereof from contact with the ground when the vehicle is on its side, said assembly comprising:
   a. a member having the shape of a handlebar;
   b. an elongate twist-grip type throttle control mounted at one end of said handlebar so as to rotate about a longitudinal axis; and
   c. protective means for shielding the outer end of said throttle control supported by said end of said handlebar and protruding outwardly therefrom longitudinally beyond the outer end of said throttle control, the protruding portion of said protective means being shaped such that the smallest angle between the longitudinal axis of said throttle control and an imaginary line extending from the periphery of the outer end of said throttle control to the periphery of said protruding portion of said protective means is less than the minimum angle of incidence between the longitudinal axis of said throttle control and the ground when said vehicle is on its side.

2. A vehicle handlebar and rotatable throttle control assembly for preventing the unintentional advancement of the throttle control by shielding the outer end thereof from contact with the ground when the vehicle is on its side, said assembly comprising:
   a. a member having the shape of a handlebar;
   b. an elongate, rotatable twist-grip type throttle control mounted at one end of said handlebar; and
   c. protective means for shielding the outer end of said throttle control supported by said end of said handlebar and protruding outwardly therefrom longitudinally beyond the outer end of said throttle control, the protruding portion of said protective means having maximum width dimensions in multiple directions normal to the direction of protrusion which are greater than the corresponding width dimensions of said throttle control in said directions.

3. A vehicle handlebar and rotatable throttle control assembly for preventing the unintentional advancement of the throttle control by shielding the outer end thereof from contact with the ground when the vehicle is on its side, said assembly comprising:
   a. a member having the shape of a handlebar, at least one end of said member being hollow;
   b. an elongate twist-grip type throttle control mounted at said hollow end of said handlebar so as to rotate about a longitudinal axis;
   c. a rigid body member having one end matingly inserted into the hollow end of said handlebar proximate the outer end of said rotatable throttle control, said inserted end having a width dimension substantially no smaller than the inside diameter of said hollow end of said handlebar;
   d. fastening means at said inserted end of said body member for fixedly attaching said body member within said handlebar; and
   e. protective means supported on the opposite end of said body member and protruding outwardly longitudinally beyond said outer end of said throttle control when said body member is fixedly attached within said handlebar for shielding the outer end of said throttle control from contact with the ground when said vehicle is on its side.

4. The assembly of claim 3 wherein the protruding portion of said protective means is shaped such that the smallest angle between the longitudinal axis of said throttle control and an imaginary line extending from the periphery of said outer end of said throttle control to the periphery of said protruding portion of said protective means is less than the minimum angle of incidence between the longitudinal axis of said throttle control and the ground when said vehicle is on its side.

5. The assembly of claim 3 wherein the maximum width dimensions of said protruding portion of said protective means in multiple directions normal to the direction of protrusion are greater than the corresponding width dimensions of said throttle control in said directions.

6. The assembly of claim 3 wherein said fastening means includes a resilient fastening member adapted for loose insertion into said hollow end of said handlebar and attached to said body member, and means for selectively expanding said fastening member until the outer surface of said fastening member tightly engages the inner surface of said handlebar.

7. The assembly of claim 6 wherein said means for expanding said fastening member includes an elongate bolt inserted through a bore formed along the longitudinal center line of said rigid body member and said resilient fastening member, said bolt engaging a nut proximate said fastening member.

8. The assembly of claim 3 wherein said rigid body member includes means defining an annular ledge around its exterior surface for preventing said body member from being inserted beyond a predetermined depth into said hollow end of said handlebar.

\* \* \* \* \*